USO10988080B1

United States Patent
Jeon et al.

(10) Patent No.: US 10,988,080 B1
(45) Date of Patent: Apr. 27, 2021

(54) LIGHT GUIDE PLATE INTEGRATED TRIM PANEL FOR VEHICLE AND METHOD OF MANUFACTURING THE SAME

(71) Applicants: HYUNDAI MOTOR COMPANY, Seoul (KR); KIA MOTORS CORPORATION, Seoul (KR); DUCK YANG INDUSTRY CO., LTD., Ulsan (KR)

(72) Inventors: Hong-Chan Jeon, Seoul (KR); Mi-Jung Yun, Yongin-si (KR); Kwang-Mo Seong, Bucheon-si (KR); Oh-Deok Kwon, Suwon-si (KR); Kwang-Seub Kim, Suwon-si (KR)

(73) Assignees: HYUNDAI MOTOR COMPANY, Seoul (KR); KIA MOTORS CORPORATION, Seoul (KR); DUCK YANG INDUSTRY CO., LTD., Ulsan (KR)

(*) Notice: Subject to any disclaimer, the term of this patent is extended or adjusted under 35 U.S.C. 154(b) by 0 days.

(21) Appl. No.: 16/882,424

(22) Filed: May 22, 2020

(30) Foreign Application Priority Data

Dec. 13, 2019 (KR) ........................ 10-2019-0167160

(51) Int. Cl.
| | |
|---|---|
| F21V 8/00 | (2006.01) |
| B29C 45/16 | (2006.01) |
| B60Q 3/64 | (2017.01) |
| B60Q 3/217 | (2017.01) |
| B60Q 3/54 | (2017.01) |

(Continued)

(52) U.S. Cl.
CPC ............. *B60Q 3/64* (2017.02); *B29C 45/16* (2013.01); *B29D 11/00663* (2013.01); *B29D 11/00721* (2013.01); *B60Q 3/217* (2017.02); *B60Q 3/54* (2017.02); *B60Q 3/78* (2017.02); *G02B 6/0051* (2013.01); *G02B 6/0065* (2013.01); *B60Q 2500/10* (2013.01)

(58) Field of Classification Search
CPC .......................... B29C 45/08; B29C 45/1639
See application file for complete search history.

(56) References Cited

U.S. PATENT DOCUMENTS

| | | | | |
|---|---|---|---|---|
| 4,874,654 A | * | 10/1989 | Funaki | ................... B29C 45/16 428/192 |
| 5,756,013 A | * | 5/1998 | Yanagihara | .......... B29C 45/062 264/1.7 |

(Continued)

FOREIGN PATENT DOCUMENTS

| | | |
|---|---|---|
| KR | 10-2009-0123310 A | 12/2009 |
| KR | 20-0459132 Y1 | 2/2012 |

(Continued)

*Primary Examiner* — Rhonda S Peace
(74) *Attorney, Agent, or Firm* — McDonnell Boehnen Hulbert & Berghoff LLP

(57) ABSTRACT

A light guide plate integrated trim panel for a vehicle is provided and includes, in the trim panel for the vehicle mounted to an interior trim of the vehicle, a light guide plate configured to diffuse light emitted from a light source; and a base formed to surround the circumference and the bottom surface of the light guide plate, wherein the side surface of the light guide plate is formed to be stepped to be fixed by the base holding the circumference of the light guide plate.

10 Claims, 9 Drawing Sheets

(51) Int. Cl.
 *B60Q 3/78* (2017.01)
 *B29D 11/00* (2006.01)

(56) References Cited

U.S. PATENT DOCUMENTS

| | | | | |
|---|---|---|---|---|
| 6,071,454 | A * | 6/2000 | Shimizu | B29C 45/14778 264/250 |
| 8,408,890 | B2 * | 4/2013 | Fukumoto | B29C 45/561 425/127 |
| 8,562,201 | B2 * | 10/2013 | Alvarez Rivera | G02B 6/0093 362/633 |
| 9,878,475 | B2 * | 1/2018 | Kawamura | B29C 45/16 |
| 2016/0082629 | A1 * | 3/2016 | Modi | B29C 45/1618 264/28 |

FOREIGN PATENT DOCUMENTS

| | | |
|---|---|---|
| KR | 10-101711080 B1 | 1/2017 |
| KR | 10-101777287 B1 | 6/2017 |
| KR | 10-1797460 B1 | 11/2017 |
| KR | 10-1806421 B1 | 12/2017 |
| KR | 10-1806428 B1 | 12/2017 |
| KR | 10-1930873 B1 | 12/2018 |

* cited by examiner

LIGHT GUIDE PLATE INTEGRATED TRIM PANEL FOR VEHICLE AND METHOD OF MANUFACTURING THE SAME

CROSS-REFERENCE TO RELATED APPLICATION

This application claims priority to Korean Patent Application No. 10-2019-0167160, filed on Dec. 13, 2019, which is incorporated herein by reference in its entirety.

BACKGROUND OF THE DISCLOSURE

Field of the Disclosure

The present disclosure relates to a trim panel used as an interior material of a vehicle and a method of manufacturing the same, and more particularly, to a light guide plate integrated trim panel for a vehicle and a method of manufacturing the same, which allow a panel to be injected with the light guide plate inserted.

Description of Related Art

A vehicle interior couples a panel and the like to a vehicle body to finish the vehicle interior.

Recently, in order to give various lighting effects when a passenger rides with the enhancement of the vehicle interior or the like, a technology for applying surface light emission to an interior trim has been expanded.

Various lighting effects are provided by attaching a surface light emission panel having a structure as in FIG. 1 to a general panel, or by applying the surface light emission panel to a part of the panel. The surface light emission panel is mounted at one side of a frame 111 and coupled with a light source 131 such as an LED lamp to give the lighting effect. The surface light emission panel includes a light guide plate 121, and a base 122 attached to the rear surface of the light guide plate 121. A diffuser 123 can be applied to the front surface of the light guide plate 121.

Such a surface light emission panel according to the related art forms the base 122 by injection, adheres to the light guide plate 121, and to adheres the diffuser 123, and then proceeds to a post process such as attaching a protective film or wrapping leather (see FIG. 2). The base 122, the light guide plate 121, and the diffuser 123 are adhered with an adhesive agent.

Meanwhile, the vehicle interior is formed in the curved surface for aesthetics, securing a space, or the like in many cases, and after the base 122 is first injected, the light guide plate 121 is attached, such that there appears the phenomenon in which the adhered site is separated over time.

Since the base 122 and the light guide plate 121 are separately manufactured and adhered to each other, a state where the base 122 and the light guide plate 121 have been adhered to each other is maintained by an adhesive force, where the surface light emission panel has been manufactured. However, since the shapes of the adhesive surfaces of the base 122 and the light guide plate 121 which have been manufactured, respectively, cannot coincide with each other, a phenomenon occurs in which the adhered site is peeled off over time.

The contents described in Description of Related Art are to help the understanding of the background of the present disclosure, and can include what is not previously known to those skilled in the art to which the present disclosure pertains.

SUMMARY OF THE DISCLOSURE

The present disclosure is intended to address the above problems, and an object of the present disclosure is to provide a light guide plate integrated trim panel for a vehicle and a method of manufacturing the same, which can allow a panel to be injected with a light guide plate, thereby preventing the light guide plate from being peeled off.

A light guide plate integrated trim panel for a vehicle according to the present disclosure for achieving the object includes, in the trim panel for the vehicle mounted to an interior trim of the vehicle, a light guide plate configured to diffuse light emitted from a light source, and a base formed to surround the circumference and the bottom surface of the light guide plate, and the side surface of the light guide plate is formed to be stepped to be fixed by the base holding the circumference of the light guide plate.

The circumference of the light guide plate is formed to be stepped so that the sectional area of the light guide plate is wider from the front surface toward the rear surface of the light guide plate.

The trim panel is mounted to a door trim of the vehicle.

The light guide plate and the base are formed in the same curved shape.

Meanwhile, a method of manufacturing a light guide plate integrated trim panel for a vehicle is provided. The method includes manufacturing the trim panel including a light guide plate configured to evenly diffuse light emitted from a light source and a base attached to one side surface of the light guide plate, and mounted to a vehicle interior, seating the light guide plate on the bottom surface of an upper mold, closing a lower mold which ascends a first lower mold and a second lower mold installed to be movable upward and downward below the upper mold, first injecting which forms a part of the base on the circumference of the light guide plate by injecting molten resin between the upper mold and the first lower mold, opening the second lower mold which descends the second lower mold so that the second lower mold contacting the bottom surface of the light guide plate is spaced apart from the bottom surface of the light guide plate, and second injecting which injects the molten resin between the light guide plate and the second lower mold.

The seating of the light guide plate allows the interior of an air hole formed to penetrate the upper mold to generate negative pressure, and locates the light guide plate on the bottom surface of the upper mold so that the light guide plate is seated on the bottom surface of the upper mold.

In the closing of the lower mold, the first lower mold moves to be spaced apart from the upper mold at an interval corresponding to the thickness of the base, and the second lower mold moves to contact the bottom surface of the light guide plate.

The area of the upper surface of the second lower mold is formed larger than the area of the light guide plate.

The circumference of the upper surface of the second lower mold is located beyond the circumference of the light guide plate.

The first lower mold and the second lower mold are installed to be movable upward and downward independently from each other.

The side surfaces of the first lower mold and the second lower mold are installed to be in close contact with each other.

In the first injecting step, the circumference of the light guide plate is injected by injecting the molten resin into a space formed by the upper mold, the first lower mold, and the second lower mold.

The second injecting step injects resin to the bottom surface of the light guide plate to form the base together with the resin injected in the first injecting step.

The method of manufacturing the light guide plate integrated trim panel for the vehicle further includes taking out the panel by opening the first lower mold and the second lower mold from the upper mold, after the second injecting is performed.

According to the light guide plate integrated trim panel for the vehicle and the method of manufacturing the same according to the present disclosure having the above configuration, since the base is injected with the film-shaped light guide plate seated on the upper mold, the trim panel for the vehicle is configured by integrating the light guide plate and the base according to the shape of the site to which the trim panel is applied. Accordingly, the peeling of the adhered site generated by adhering the light guide plate and the base manufactured previously does not occur.

In addition, the process of adhering the light guide plate and the base by using the adhesive agent becomes unnecessary.

Since the base surrounds the circumference of the light guide plate, it is not necessary to perform the separate finishing process.

DESCRIPTION OF SPECIFIC EMBODIMENTS

Figure 1:
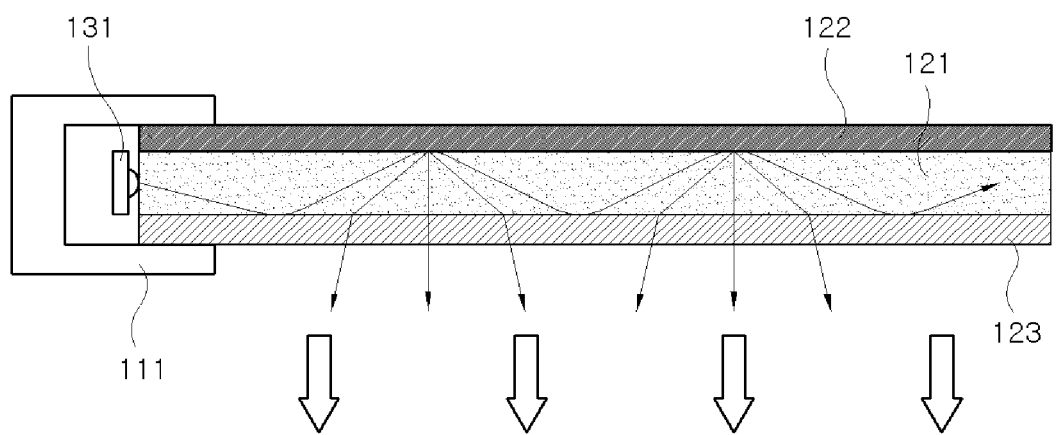
FIG. 1 is a cross-sectional diagram showing a state where a surface light emission panel according to the related art has been mounted.
Figure 2:
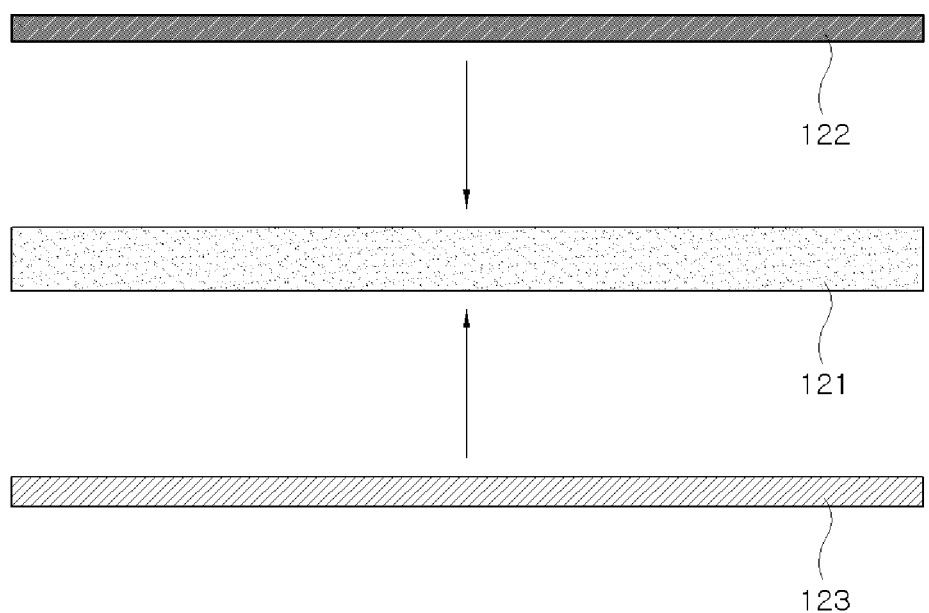
FIG. 2 is a cross-sectional diagram showing a process of bonding the surface light emission panel according to the related art.
Figure 3:
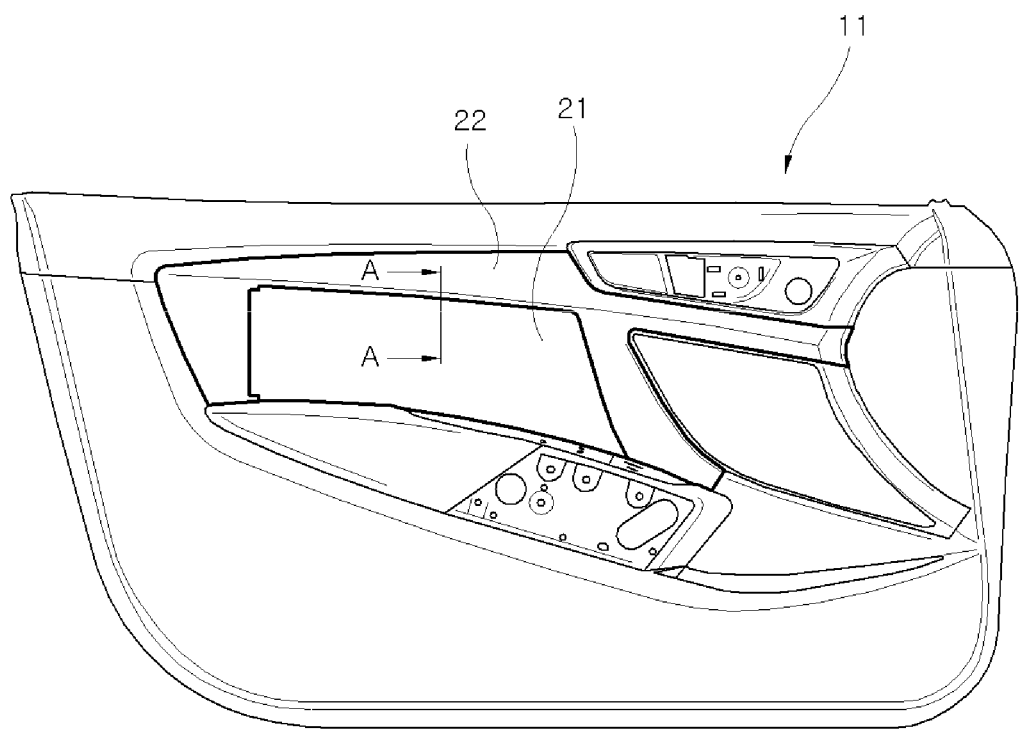
FIG. 3 is a front diagram showing a state where a trim panel for a vehicle manufactured according to a method of manufacturing a light guide plate integrated trim panel for a vehicle according to the present disclosure has been installed to a door trim.
Figure 4:
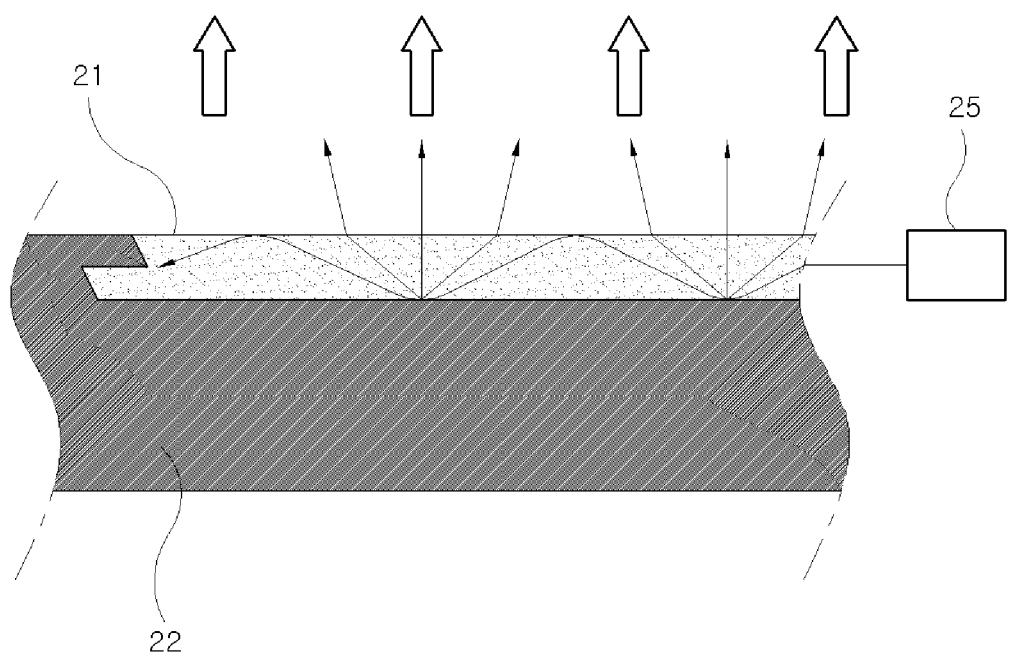
FIG. 4 is a cross-sectional diagram taken along line A-A of FIG. 3.

Hereinafter, a light guide plate integrated trim panel for a vehicle and a method of manufacturing the same according to the present disclosure will be described in detail with reference to the accompanying drawings.

A trim panel for a vehicle according to the present disclosure includes a light guide plate 21 configured to diffuse light emitted from a light source 25, and a base 22 formed to surround the circumference and the bottom surface of the light guide plate 21.

The light guide plate 21 is made of a thin synthetic resin material. Since the light guide plate 21 is thin and has a film shape (for example, 0.4 mm to 1.5 mm in thickness), the light guide plate 21 can be easily deformed according to the shape of the mold. The light guide plate 21 is made of a polycarbonate material having good light transmittance so that light emitted from the light source is evenly diffused.

The base 22 is injected by the manufacturing method to be described later with the light guide plate 21 inserted, thereby becoming a trim panel of the vehicle. The base 22 is adhered to the circumference and the bottom surface of the light guide plate 21. The base 22 and the light guide plate 21 are not adhered by using an adhesive agent, but adhered by injecting the base 22 with the light guide plate 21 inserted.

In particular, the present disclosure is a structure in which the circumference of the light guide plate 21 is formed to be stepped and the base 22 holds the light guide plate 21, thereby preventing the light guide plate 21 and the base 22 from being peeled off.

The trim panel for the vehicle can be mounted to a vehicle interior, for example, the door trim 11. The light emitted by the light source 25 with the trim panel mounted can be diffused by the light guide plate 21, thereby illuminating the vehicle interior. By injecting the base 22 later with the light guide plate 21 inserted, it is possible to easily manufacture a curved surface, and even after time elapses, the light guide plate 21 and the base 22 are not peeled off from each other.

When the light is emitted from the light source 25 such as an LED lamp by the light guide plate 21, the light can be diffused to the entire region of the light guide plate 21, and then can illuminate the vehicle interior, thereby enhancing the vehicle interior.

Since the light guide plate 21 and the base 22 are manufactured by the same upper mold 31, first lower mold 32, and second lower mold 33, the light guide plate 21 and the base 22 also have the same curved shape.

A method of manufacturing the light guide plate integrated trim panel for the vehicle according to the present disclosure will be described with reference to FIGS. 5 and 6 as follows.

The method of manufacturing the light guide plate integrated trim panel for the vehicle according to the present disclosure includes seating the light guide plate 21 on the bottom surface of the upper mold 31 (S110), closing the lower mold which ascends the first lower mold 32 and the second lower mold 33 installed to be movable upward and downward below the upper mold 31 (S120), first injecting which forms a part of the base 22 on the circumference of the light guide plate 21 by injecting a molten resin between the upper mold 31 and the first lower mold 32 (S130), opening the second lower mold which descends the second lower mold 33 so that the second lower mold 33 contacting the bottom surface of the light guide plate 21 is spaced apart from the bottom surface of the light guide plate 21 (S140), and second injecting which injects the molten resin between the light guide plate 21 and the second lower mold 33 (S150).

Figure 5A:
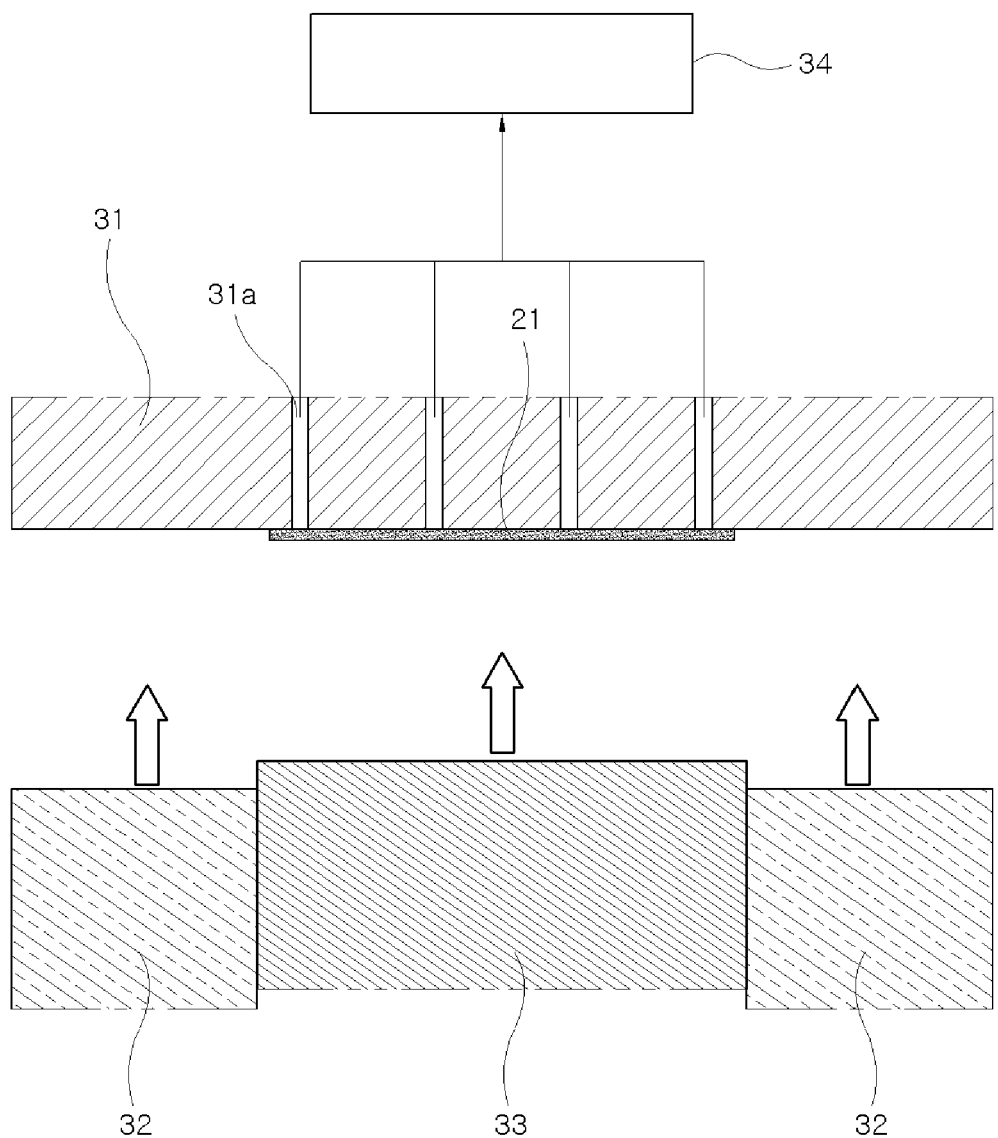
FIGS. 5A to 5D are schematic diagrams sequentially showing steps of the method of manufacturing the light guide plate integrated trim panel for the vehicle according to the present disclosure.
Figure 6:
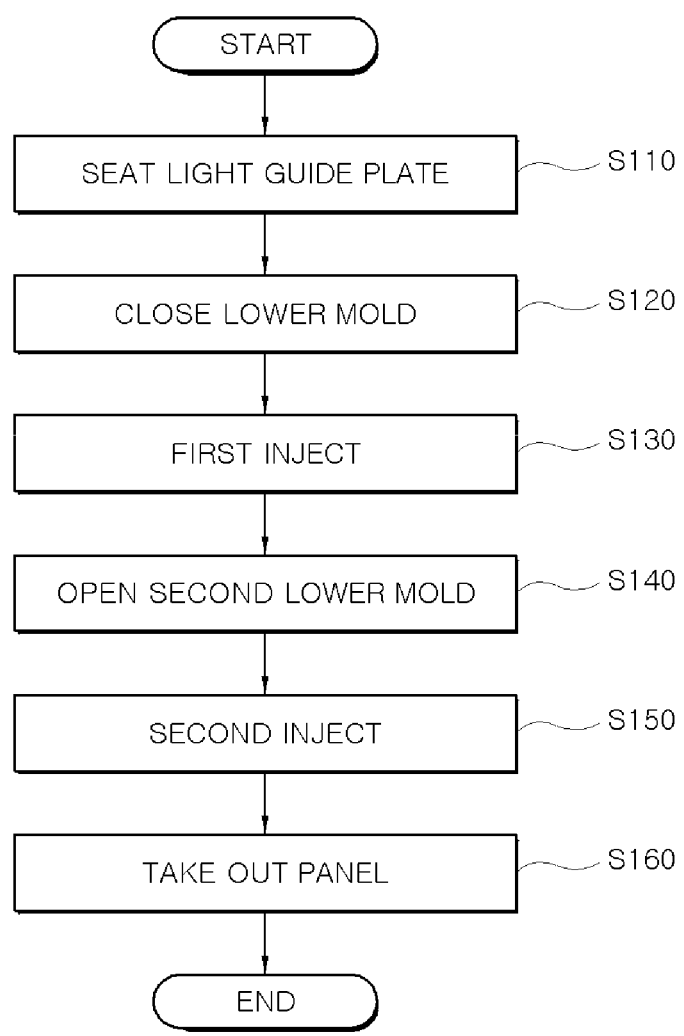
FIG. 6 is a flowchart showing the method of manufacturing the light guide plate integrated trim panel for the vehicle according to the present disclosure.

The seating of the light guide plate (S110) seats the light guide plate 21 on the bottom surface of the upper mold 31 (see FIG. 5A).

The light guide plate 21 maintains its inserted state when the base 22 is injected. Unlike a metal material such as steel, the light guide plate 21 made of a synthetic resin material needs to be applied with a structure capable of maintaining the seated state. To this end, by forming a plurality of air holes 31a capable of penetrating the upper mold 31 in the upper mold 31, and allowing the interior of the air hole 31a to become a negative pressure, the light guide plate 21 maintains the state seated on the bottom surface of the upper mold 31. For example, the air hole 31a is connected to a negative pressure generating member 34 configured to generate negative pressure to allow the interior of the air hole 31a to become the negative pressure, thereby maintaining the seated state. Here, the negative pressure generating member 34 can be a vacuum pump.

The air holes 31a are preferably formed at regular intervals with respect to the area where the light guide plate 21 has been seated, such that the light guide plate 21 is seated on the bottom surface of the upper mold 31 at an even adsorption force, and is not pushed by the injection pressure in the first injecting (S130) and the second injecting (S150).

The closing of the lower mold (S120) moves the first lower mold 32 and the second lower mold 33 together to the upper mold 31 side so that an interval between the first lower mold 32 and the second lower mold 33 and the upper mold 31 becomes narrow (see FIG. 5A).

In the closing of the lower mold (S120), the first lower mold 32 moves to be spaced apart from the upper mold 31 at an interval corresponding to the thickness of the base 22, and the second lower mold 33 moves to contact the bottom surface of the light guide plate 21.

The first lower mold 32 and the second lower mold 33 are formed to be movable upward and downward individually below the upper mold 31. The side surfaces of the first lower mold 32 and the second lower mold 33 are in close contact with each other. The first lower mold 32 is located outside the second lower mold 33.

Accordingly, the first lower mold 32 moves to be spaced apart from the upper mold 31, and the second lower mold 33 is in close contact with the bottom surface of the light guide plate 21, such that the second lower mold 33 serves to support the lower portion of the light guide plate 21. In addition, the base 22 is formed on the circumference of the light guide plate 21 by injection.

In the present disclosure, although it is shown that the molding surfaces of the upper mold 31, the first lower mold 32, and the second lower mold 33 have been formed in a plane, they are formed in curved surfaces correspondingly if the trim panel needs to be formed in a curved surface.

The first injecting (S130) forms a part of the base 22 on the circumference of the light guide plate 21 by injecting a molten resin between the upper mold 31 and the first lower mold 32.

The base 22 is formed in a shape of covering the circumference and the bottom surface of the light guide plate 21, and since the bottom surface of the light guide plate 21 is closed by the second lower mold 33, the first injecting (S130) can perform the injection by injecting the molten resin only between the upper mold 31 and the first lower mold 32.

Figure 5B:
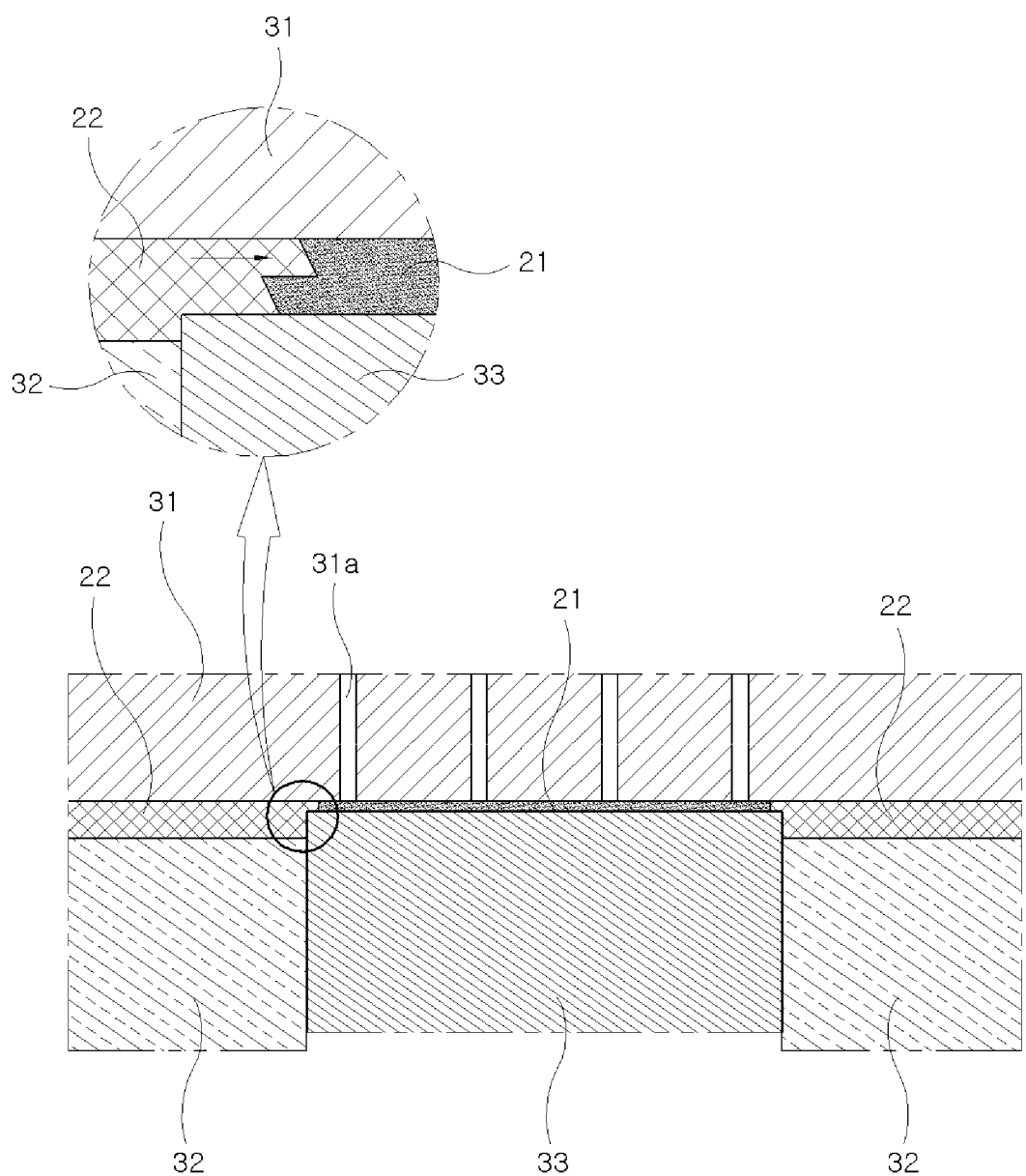

At this time, as shown in an enlarged diagram of FIG. 5B, since the circumference of the light guide plate 21 is closed vertically by the upper mold 31 and the second lower mold 33, the resin injected between the upper mold 31 and the first lower mold 32 is also injected between the upper mold 31 and a stepped site (see arrow).

Since the light guide plate 21 is constrained by the upper mold 31 and the second lower mold 33, the light guide plate 21 is not pushed in the first injecting (S130).

Meanwhile, the first injecting (S130) also includes a state of curing the resin.

Figure 5C:
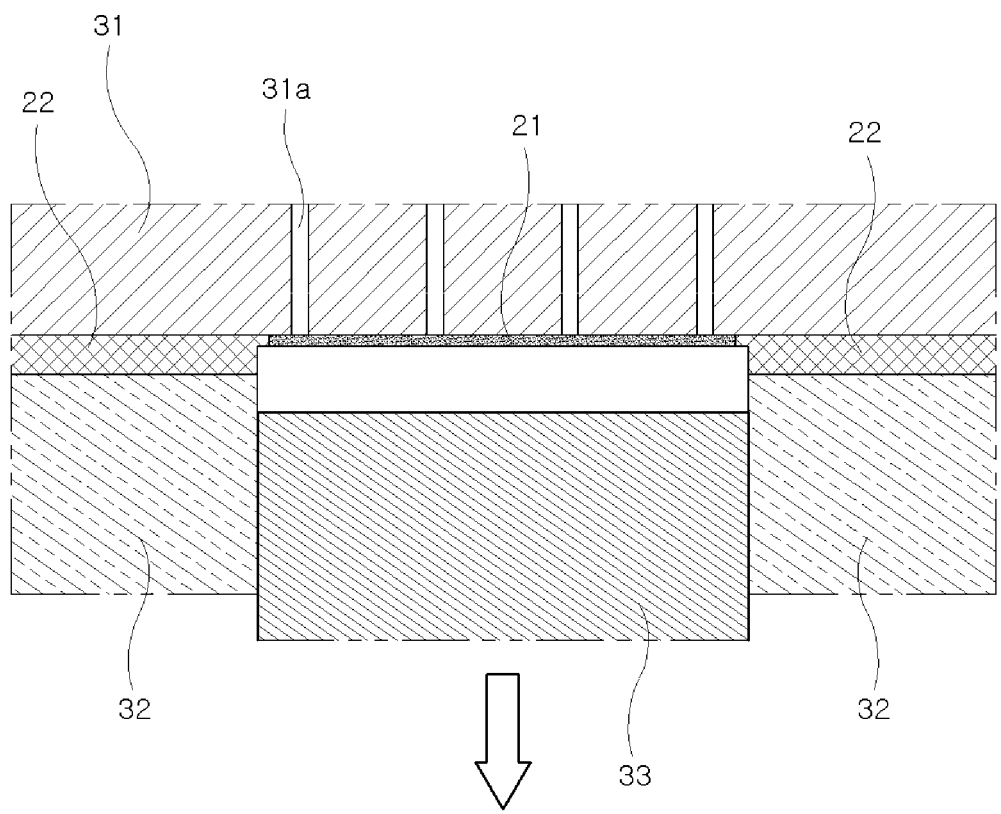

The opening of the second lower mold (S140) descends the second lower mold 33 so that the second lower mold 33 contacting the bottom surface of the light guide plate 21 is spaced apart from the bottom surface of the light guide plate 21 (see FIG. 5C).

Since it is a state of having formed a part of the base 22 by injection-molding the circumference of the light guide plate 21 with the resin, the second lower mold 33 is descended so that an interval is formed between the light guide plate 21 and the second lower mold 33 in order to form the base 22 on the bottom surface of the light guide plate 21.

Figure 5D:
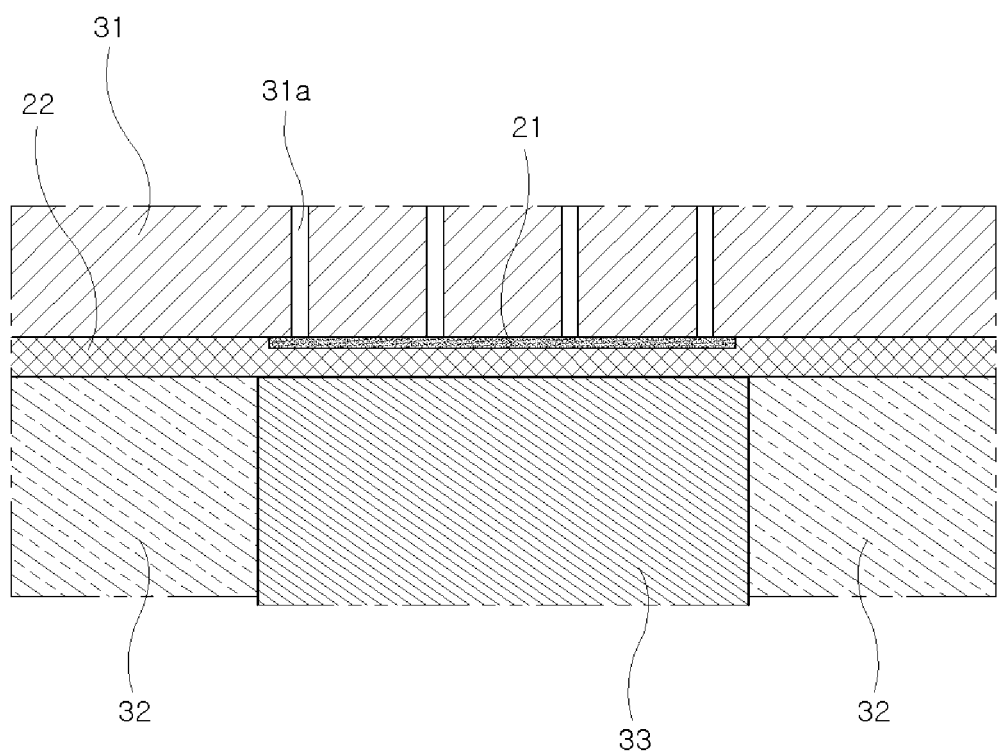

The second injecting (S150) injects the molten resin between the light guide plate 21 and the second lower mold 33 (see FIG. 5D).

In the second injecting step (S150), when the molten resin is injected between the light guide plate 21 and the second lower mold 33, the base 22 is formed on the bottom surface of the light guide plate 21 and at the same time, the base 22 formed on the circumference of the light guide plate 21 in the first injecting (S130) is integrally formed. Since the area of the upper surface of the second lower mold 33 is formed larger than the area of the light guide plate 21, the base 22 molded in the first injecting (S130) is also exposed to a space formed by descending the second lower mold 33. Accordingly, when the second injecting (S150) is performed, the base 22 is formed on the bottom surface of the light guide plate 21 and at the same time, the base 22 already formed is integrally formed.

Meanwhile, the second injecting step (S150) also includes a state of curing the resin.

Take out panel (S160) takes out the trim panel by opening the first lower mold 32 and the second lower mold 33 from the upper mold 31 when the molding of the trim panel is completed by the upper mold 31, the first lower mold 32, and the second lower mold 33.

The trim panel can be mounted to one side of the vehicle interior, for example, the door trim 11, thereby obtaining the surface light emission effect.

Meanwhile, the surface of the trim panel, in particular, the surface of the base 22 can be attached with a film having a pattern or a color, or the like, or can be finished with a finishing material for texture or touch.

In the present disclosure, the base 22 is formed by injection with the light guide plate 21 inserted between the upper mold 31, the first lower mold 32, and the second lower mold 33, thereby manufacturing the trim panel in the adhered state without the adhesive agent.

In particular, when the trim panel has a curved shape, since the trim panel is manufactured by the same upper mold 31, first lower mold 32, and second lower mold 33, the light guide plate 21 and the base 22 have the same curved shape, such that the adhered site of the light guide plate 21 and the base 22 is not separated even after time elapses.

What is claimed is:

1. A method of manufacturing a trim panel for a vehicle which manufactures the trim panel comprising a light guide plate configured to evenly diffuse light emitted from a light source and a base attached to one side surface of the light guide plate, and mounted to a vehicle interior, the method of manufacturing the light guide plate integrated trim panel for the vehicle comprising:

seating the light guide plate on the bottom surface of an upper mold;

closing a lower mold which ascends a first lower mold and a second lower mold installed to be movable upward and downward below the upper mold;

first injecting which forms a part of the base on the circumference of the light guide plate by injecting molten resin between the upper mold and the first lower mold;

opening the second lower mold which descends the second lower mold so that the second lower mold contacting the bottom surface of the light guide plate is spaced apart from the bottom surface of the light guide plate; and second injecting which injects the molten resin between the light guide plate and the second lower mold.

2. The method of manufacturing the light guide plate integrated trim panel for the vehicle of claim 1,
wherein the seating of the light guide plate allows the interior of an air hole formed to penetrate the upper mold to become a negative pressure, and locates the light guide plate on the bottom surface of the upper mold so that the light guide plate is seated on the bottom surface of the upper mold.

3. The method of manufacturing the light guide plate integrated trim panel for the vehicle of claim 1,
wherein in the closing of the lower mold,
the first lower mold moves to be spaced apart from the upper mold at an interval corresponding to the thickness of the base, and
the second lower mold moves to contact the bottom surface of the light guide plate.

4. The method of manufacturing the light guide plate integrated trim panel for the vehicle of claim 1,
wherein the area of the upper surface of the second lower mold is formed larger than the area of the light guide plate.

5. The method of manufacturing the light guide plate integrated trim panel for the vehicle of claim 4,
wherein the circumference of the upper surface of the second lower mold is located further outside than the circumference of the light guide plate.

6. The method of manufacturing the light guide plate integrated trim panel for the vehicle of claim 1,
wherein the first lower mold and the second lower mold are installed to be movable upward and downward independently from each other.

7. The method of manufacturing the light guide plate integrated trim panel for the vehicle of claim 6,
wherein the side surfaces of the first lower mold and the second lower mold are installed to be in close contact with each other.

8. The method of manufacturing the light guide plate integrated trim panel for the vehicle of claim 1,
wherein in the first injecting, the circumference of the light guide plate is injected by injecting the molten resin into a space formed by the upper mold, the first lower mold, and the second lower mold.

9. The method of manufacturing the light guide plate integrated trim panel for the vehicle of claim 1,
wherein the second injecting injects resin to the bottom surface of the light guide plate to form the base together with the resin injected in the first injecting.

10. The method of manufacturing the light guide plate integrated trim panel for the vehicle of claim 1, further comprising:
taking out the panel by opening the first lower mold and the second lower mold from the upper mold, after the second injecting is performed.

* * * * *